(12) United States Patent
Liu et al.

(10) Patent No.: US 11,509,227 B2
(45) Date of Patent: Nov. 22, 2022

(54) ACTIVE CLAMP FLYBACK CONVERTER

(71) Applicant: Texas Instruments Incorporated, Dallas, TX (US)

(72) Inventors: Pei-Hsin Liu, Westford, MA (US); Cheng Liu, Shanghai (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 150 days.

(21) Appl. No.: 16/928,728

(22) Filed: Jul. 14, 2020

(65) Prior Publication Data
US 2021/0021199 A1  Jan. 21, 2021

Related U.S. Application Data

(60) Provisional application No. 62/876,288, filed on Jul. 19, 2019.

(51) Int. Cl.
*H02M 3/335* (2006.01)
*H02M 1/34* (2007.01)

(52) U.S. Cl.
CPC ... *H02M 3/33569* (2013.01); *H02M 3/33523* (2013.01); *H02M 1/344* (2021.05)

(58) Field of Classification Search
CPC ......... H02M 3/33569; H02M 3/33523; H02M 1/344; H02M 1/0006; H02M 1/0032; H02M 1/0058
See application file for complete search history.

(56) References Cited

U.S. PATENT DOCUMENTS

| | | | | |
|---|---|---|---|---|
| 7,362,592 B2* | 4/2008 | Yang | ................. | H02M 3/33507 363/21.16 |
| 7,486,528 B2* | 2/2009 | Yang | ................. | H02M 3/33507 363/21.13 |
| 8,143,845 B2* | 3/2012 | Choi | ........................ | H02J 7/08 320/108 |
| 8,179,700 B2* | 5/2012 | Yang | ................. | H02M 3/33507 363/21.16 |
| 8,432,109 B2* | 4/2013 | Yang | ................. | H05B 45/3725 315/276 |
| 9,270,184 B2* | 2/2016 | Yang | ................. | H02M 3/33515 |
| 9,343,982 B2* | 5/2016 | Yang | ................. | H02M 3/33523 |
| 9,917,523 B1* | 3/2018 | Lu | ........................... | H02M 3/18 |
| 10,432,095 B2* | 10/2019 | Djenguerian | ........... | H02M 1/08 |
| 10,554,133 B2 | 2/2020 | Liu et al. | | |

(Continued)

*Primary Examiner* — Kyle J Moody

(74) *Attorney, Agent, or Firm* — Ray A. King; Charles A. Brill; Frank D. Cimino

(57) ABSTRACT

A converter system (100) includes a transformer (102) having a primary side (104) and a secondary side (106), a first switch (114) with a first terminal (1151) coupled to the primary side (104) and a second terminal (1152) coupled to a voltage supply terminal, a second switch (116) coupled to the first terminal (1151) of the first switch (114), loop control circuitry (119), coupled to the secondary side (106), and configured to generate an offset signal based on an output voltage provided at the secondary side (106) and to generate a compensated signal by compensating the offset signal to a sensed signal being representative of a first current flowing through the primary side (104), and switch control circuitry (120), coupled to the loop control circuitry (119), and configured to operate the first and second switches (114, 116) based on the compensated signal.

20 Claims, 5 Drawing Sheets

(56) References Cited

U.S. PATENT DOCUMENTS

| | | | |
|---|---|---|---|
| 11,088,622 B2* | 8/2021 | Peng | H02M 1/08 |
| 11,165,355 B2* | 11/2021 | Wong | H02M 1/342 |
| 2004/0264216 A1* | 12/2004 | Mednik | H02M 3/33523 |
| | | | 363/18 |
| 2006/0034102 A1* | 2/2006 | Yang | H02M 3/33507 |
| | | | 363/21.13 |
| 2015/0062981 A1* | 3/2015 | Fang | H02M 3/33507 |
| | | | 363/21.17 |
| 2017/0176919 A1* | 6/2017 | Asano | H02M 3/33507 |
| 2017/0264206 A1* | 9/2017 | Rana | H02M 1/083 |
| 2019/0020277 A1 | 1/2019 | Liu et al. | |
| 2019/0089250 A1 | 3/2019 | Liu et al. | |
| 2019/0165681 A1 | 5/2019 | Liu et al. | |
| 2019/0260284 A1 | 8/2019 | Liu | |
| 2020/0059152 A1 | 2/2020 | Liu et al. | |
| 2020/0127575 A1 | 4/2020 | Liu et al. | |

* cited by examiner

ACTIVE CLAMP FLYBACK CONVERTER

CROSS-REFERENCE TO RELATED APPLICATION

This application is a claims priority to U.S. Provisional Patent Application 62/876,288, filed on Jul. 19, 2019, which application is hereby incorporated herein by reference in its entirety.

TECHNICAL FIELD

The present disclosure relates to integrated circuits and, more particularly, to an active clamp flyback converter circuit.

BACKGROUND

With the rapidly growing market of portable adapters, universal serial bus (USB) power delivery is becoming a development trend. It is desired that a single adapter can support a wide range of output voltage for some type-C connector applications. A portable adapter is desired to meet stringent efficiency specification defined in energy standards such as Code of Conduct (CoC) Tier 2 and Department of Energy's level VI (DoE VI) energy standards, and to support wide output load applications, such as applications with 5V/3 A and 20V/5 A. Active clamp fly-back topology is widely used in portable adapters.

SUMMARY

The present disclosure relates to integrated circuits and, more particularly, to an active clamp flyback converter system. A converter with an active clamp flyback (ACF) topology may include a transformer having a primary side configured to receive an input voltage and a secondary side configured to provide an output voltage of the converter, a first switch coupled to the primary side of the transformer, a diode coupled to the secondary side of the transformer, and clamping circuitry coupled across the primary side of the transformer. The clamping circuitry may include a clamping capacitor and a second switch coupled in series between two terminals of the primary side of the transformer.

In one example, the present disclosure provides a converter system including a transformer that includes a primary side and a secondary side, a first switch having a first terminal and a second terminal, the first terminal coupled to the primary side of the transformer and the second terminal coupled to a voltage supply terminal, a second switch the first terminal of the first switch. The converter system also includes loop control circuitry coupled to the secondary side of the transformer, and the loop control circuitry configured to generate an offset signal based on an output voltage at the secondary side of the transformer, and to generate a compensated signal by compensating the offset signal to a sensed signal, the sensed signal being representative of a first current flowing through the primary side of the transformer, and switch control circuitry coupled to the loop control circuitry, and the switch control circuitry configured to operate the first and second switches based on the compensated signal.

In another example, the present disclosure provides a controller including loop control circuitry adapted to be coupled to a secondary side of a transformer of a converter system, and the loop control circuitry configured to generate an offset signal based on an output voltage provided at the secondary side of the transformer, and to generate a compensated signal by compensating the offset signal to a sensed signal proportional to a first current flowing through a primary side of the transformer. The controller also includes switch control circuitry coupled to the loop control circuitry, and the switch control circuitry configured to instruct first and second switches based on the compensated signal.

In yet another example, the present disclosure provides a method including generating a sampled voltage based on an output voltage at a secondary side of a transformer of a converter system, generating an offset signal based on the sampled voltage, generating a sensed signal by sensing a first current flowing through a primary side of the transformer, generating a compensated signal by compensating the offset signal to the sensed signal, and operating the converter system based on the compensated signal.

DETAILED DESCRIPTION

The present disclosure relates to converter systems with an active clamp flyback (ACF) topology.

A converter with an active clamp flyback (ACF) topology may include a transformer having a primary side coupled to receive an input voltage and a secondary side to provide an output voltage of the converter, a first switch coupled to the primary side of the transformer, a diode coupled to the secondary side of the transformer, and clamping circuitry coupled across the primary side of the transformer. The clamping circuitry may include a clamping capacitor and a second switch coupled in series between two terminals of the primary side of the transformer. As the active clamp flyback topology allows zero voltage soft switching (ZVS) under all line conditions, e.g., input voltage conditions, and all load conditions e.g., output voltage conditions, eliminates leakage inductance and snubber losses, and enables high frequency and high power density power conversion, the active clamp fly-back topology is widely used in portable adapters. Examples of controlling the first switch are described in U.S. Pat. No. 10,135,341, which is assigned herewith, and is hereby incorporated herein by reference in its entirety.

Figure 1:
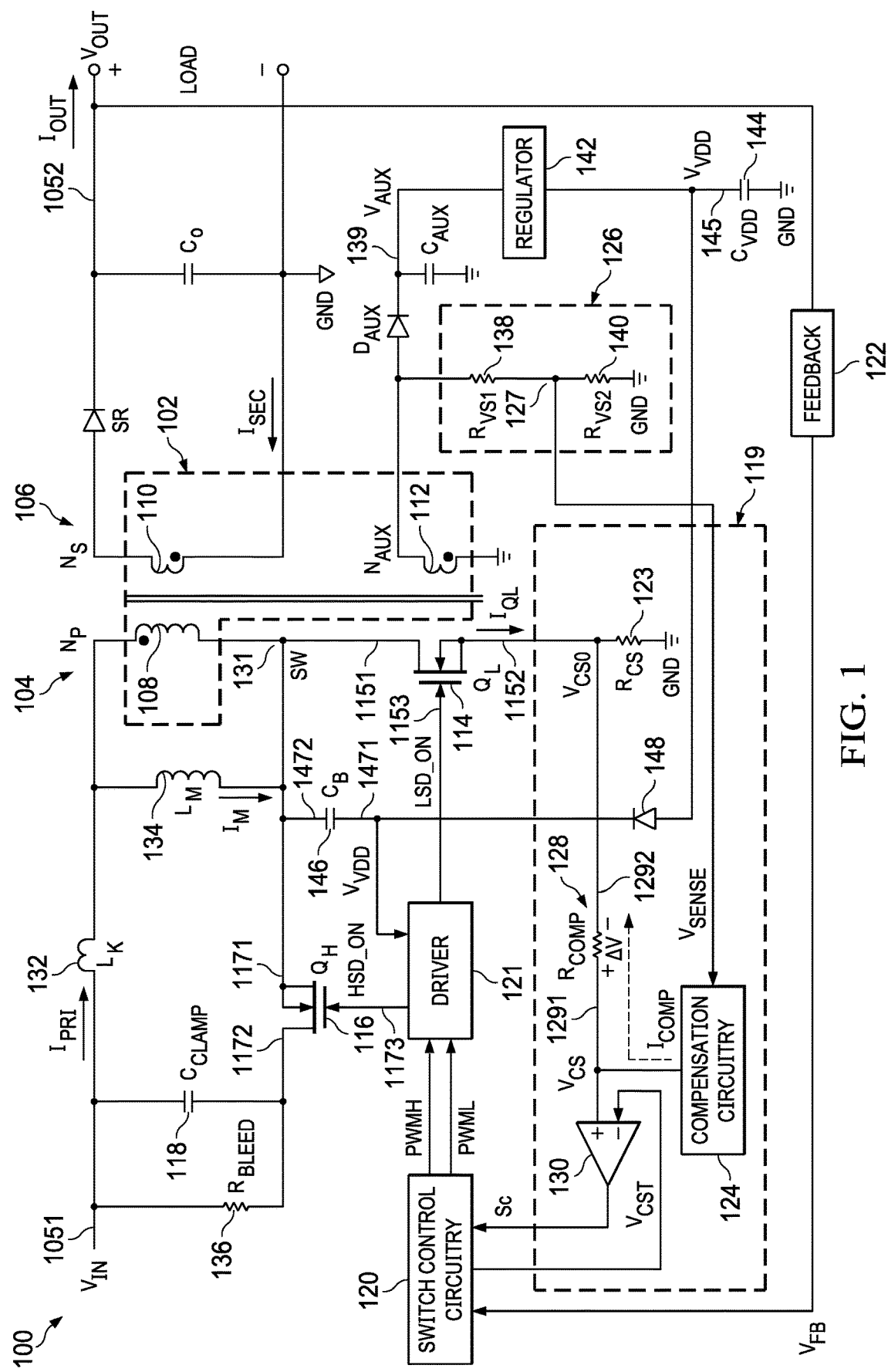
FIG. 1 is a schematic circuit diagram of a converter system in accordance with an implementation of the present disclosure.

Referring now to FIG. 1, a schematic block diagram of a converter system 100 in accordance with an implementation of the present disclosure is shown. More particularly, FIG. 1 shows a converter system 100. The converter system 100 includes a transformer 102 having a primary side 104 coupled to an input voltage terminal 1051 of the converter system 100, the input voltage terminal 1051 adapted to receive an input voltage $V_{IN}$, and a secondary side 106 coupled to an output voltage terminal 1052 of the converter system 100, the output voltage terminal 1052 adapted to output an output voltage $V_{OUT}$ and to provide an output current $I_{OUT}$ to a load (not shown) coupled between the output voltage terminal 1052 and a ground terminal GND. The converter system 100 is configurable to convert the input voltage $V_{IN}$ to a first desired output voltage, e.g. a relative high voltage, such as 20V, or to convert the input voltage VIN to a second desired output voltage, e.g. a relative low voltage, such as 5V. In one example, the primary side 104 includes a primary side winding 108, and the secondary side 106 includes a secondary side winding 110 and an auxiliary winding 112. The converter system 100 also includes a first switch $Q_L$ 114 with a first terminal 1151 coupled to the primary side winding 108 at a switching terminal SW 131, a second terminal 1152 coupled to a voltage supply terminal, for example, the ground terminal GND, and a gate terminal 1153, and a second switch $Q_H$ 116 having a first terminal 1171 coupled to the switching terminal SW 131, a second terminal 1172 coupled to an input voltage terminal $V_{IN}$ of the converter system 100 through a clamp capacitor $C_{CLAMP}$ 118, and a gate terminal 1173. A bleed resistor $R_{BLEED}$ 136 is coupled in parallel with the clamp capacitor $C_{CLAMP}$ 118. The first and second switches 114 and 116, also named respectively as low side and high side switches, can be transistors, for example, N-channel metal oxide semiconductor field effect transistors (MOSFETs).

The primary side 104 takes the input voltage $V_{IN}$ that induces a current $I_{PRI}$ to flow through the primary side winding 108 when the first switch 114 is on. The system 100 has a leakage inductance $L_K$ 132 between the input voltage terminal 1051 and the primary side winding 108, and a magnetizing inductance $L_M$ 134 in parallel with the primary side winding 108. The magnetizing inductance $L_M$ 134 and the leakage inductance $L_K$ 134 are not physical circuit elements; rather they illustrate inductances introduced into the system 100 by the primary side winding 108. The magnetizing current $I_M$ is the current introduced into the converter by the magnetizing inductance $L_M$ 134.

In one example, the first switch 114 is switched between on and off states based on the gate drive signal LSD_ON, and the second switch 116 is switched between on and off states based on the gate drive signal HSD_ON. In one example, the converter system 100 operates between a first switching mode, e.g. a soft switching mode, and a second switching mode, e.g. a hard switching mode. In the soft switching mode, the first and second switches 114 and 116 are configured to be switched on and off alternately to each other based on a current $I_{QL}$ flowing through the first switch 114 and a dynamic threshold $V_{CST}$. In the hard switching mode, the second switch 116 is off, and the first switch 114 is configured to be switched off based on the current flowing through the first switch 114 and a fixed minimum threshold $V_{CST(min)}$.

The converter system 100 further includes loop control circuitry 119, and switch control circuitry 120 coupled to the loop control circuitry 119.

The loop control circuitry 119 is configured to receive a current $I_{QL}$ flowing through the first switch $Q_L$ 114, a sensed voltage $V_{SENSE}$ proportional to the output voltage VOUT of the converter system 100, the threshold $V_{CST}$ from the switch control circuitry 120. The loop control circuitry 119 is also configured to generate a current control signal $S_C$ based on the current $I_{QL}$, the sensed voltage $V_{SENSE}$, and the threshold $V_{CST}$.

The switch control circuitry 120 is configured to generate first and second control signals PWML and PWMH to respectively operate the first and second switches 114 and 116 based on the current control signal $S_C$. The converter system 100 further includes driver 121 coupled to the switch control circuitry 120 and configured to generate the gate drive signals LSD_ON and HSD_ON. The gate driver signal LSD_ON is configured to switch the first switch 114 between the on and off states based on the control signal PWML, and the gate driver signal HSD_ON is configured to switch the second switch 116 between the on and off states based on the control signal PWMH.

The converter system 100 further includes feedback circuitry 122 coupled between the output voltage terminal 1052 of the converter system 100 and the switch control circuitry 120, and the feedback circuitry 122 configured to generate a feedback voltage $V_{FB}$ proportional to the output voltage $V_{OUT}$. The switch control circuitry 120 is further configured to provide the threshold VCST dynamically based on, for example, proportional to, the feedback voltage $V_{FB}$.

In one example, the loop control circuitry 119 includes a current sense resistor $R_{CS}$ 123 coupled in series with the first switch 114 between the second terminal 1152 of the first switch 114 and the ground terminal GND. The current flowing through the primary side winding 108 is sensed by sensing the current $I_{QL}$ flowing through the first switch 114. In one example, the current flowing through the primary side winding 108 is sensed by sensing a voltage $V_{CS0}$ across the current sense resistor $R_{CS}$ 123.

The loop control circuitry 119 also includes compensation circuitry 124 configured to generate a compensation current $I_{COMP}$ based on the output voltage $V_{OUT}$. In one example, the auxiliary winding 112 is coupled to an auxiliary voltage output terminal $V_{AUX}$ 139 through an auxiliary diode $D_{AUX}$. The converter system 100 includes a voltage divider 126 coupled to the auxiliary voltage output terminal $V_{AUX}$ 139. The voltage divider 126 includes first and second resistors $R_{VS1}$ 138 and $R_{VS2}$ 140 coupled at a common terminal 127 that provides a sensed voltage $V_{SENSE}$ proportional to the auxiliary winding voltage $V_{AUX}$. The auxiliary winding voltage $V_{AUX}$ is proportional to the output voltage $V_{OUT}$, and provided in accordance with the equation below:

$$V_{AUX} \approx V_{OUT} \cdot N_{AUX}/N_S \quad (1)$$

where $N_{AUX}$ is the number of turns of the auxiliary winding 112, and $N_S$ is the number of turns of the secondary side winding 110.

In one example, the converter system 100 includes a regulator 142 coupled to the auxiliary voltage output terminal $V_{AUX}$ 139 and a VDD capacitor $C_{VDD}$ 144 coupled between the regulator 142 and ground. The regulator 142 is configured to provide a voltage $V_{VDD}$ at a first terminal 145 of the VDD capacitor 144. The first terminal 145 of the VDD capacitor 144 is coupled to a first terminal 1471 of a bootstrap capacitor $C_B$ 146 through a diode 148. A second terminal 1472 of the bootstrap capacitor $C_B$ is coupled to the primary side winding 108. The voltage $V_{VDD}$, provided at the first terminal 1471 of the bootstrap capacitor $C_B$ is provided to the driver 121 as a DC power supply voltage provided to drain terminals of transistors (not shown) of the driver 121.

The loop control circuitry 119 further includes a compensation resistor $R_{COMP}$ 128 with a first terminal 1291 coupled to the compensation circuitry 124 and a second terminal 1292 coupled to the second terminal 1152 of the first switch 114. An offset signal ΔV, which is a voltage across the compensation resistor $R_{COMP}$ 128, is generated based on the compensation current $I_{COMP}$ and the resistance $R_{COMP}$ of the compensation resistor 128. A voltage at the first terminal 1291 of the compensation resistor 128 is a compensated signal $V_{CS}$, which is generated by adding the offset signal ΔV to a voltage $V_{CS0}$ at the second terminal 1152 of the first switch 114.

The loop control circuitry 119 further includes a comparator 130 having a non-inverting input terminal coupled to the first terminal 1291 of the compensation resistor 128, configured to receive the compensated signal $V_{CS}$. The comparator 130 also includes an inverting input terminal coupled to the switch control circuitry 120. The inverting input terminal of the comparator 130 is configured to receive the threshold $V_{CST}$. An output terminal of the comparator 130 coupled to the switch control circuitry 120, and is configured to output the current control signal $S_C$ to control the first and second switches 114 and 116 via the switch control circuitry 120 and the driver 121. In one example, the switch control circuitry 120 is configured to switch off the first switch 114 when the compensated signal $V_{CS}$ is greater than the threshold $V_{CST}$.

In soft switching mode, the switching frequency $f_{SW}$ of the converter system 100 increases with decreasing of an output load, e.g. an output power Po provided to the output load, and the voltage $V_{CS0}$ across the current sensing resistor $R_{CS}$ 123 decreases with the decreasing of the output load. The switching frequency $f_{SW}$ will be much higher under a light load condition, which may lead to poor light load efficiency.

In one example, the switch control circuitry 120 is configured to set a minimum value $V_{CST(min)}$ of the threshold $V_{CST}$ to limit the maximum switching frequency $f_{SW}$. When the threshold $V_{CST}$ decreases to the minimum value $V_{CST(min)}$, the converter system 100 switches to a hard-switching mode with peak of $V_{CS0}$ fixed at $V_{CST(min)}$−ΔV.

Figure 2:
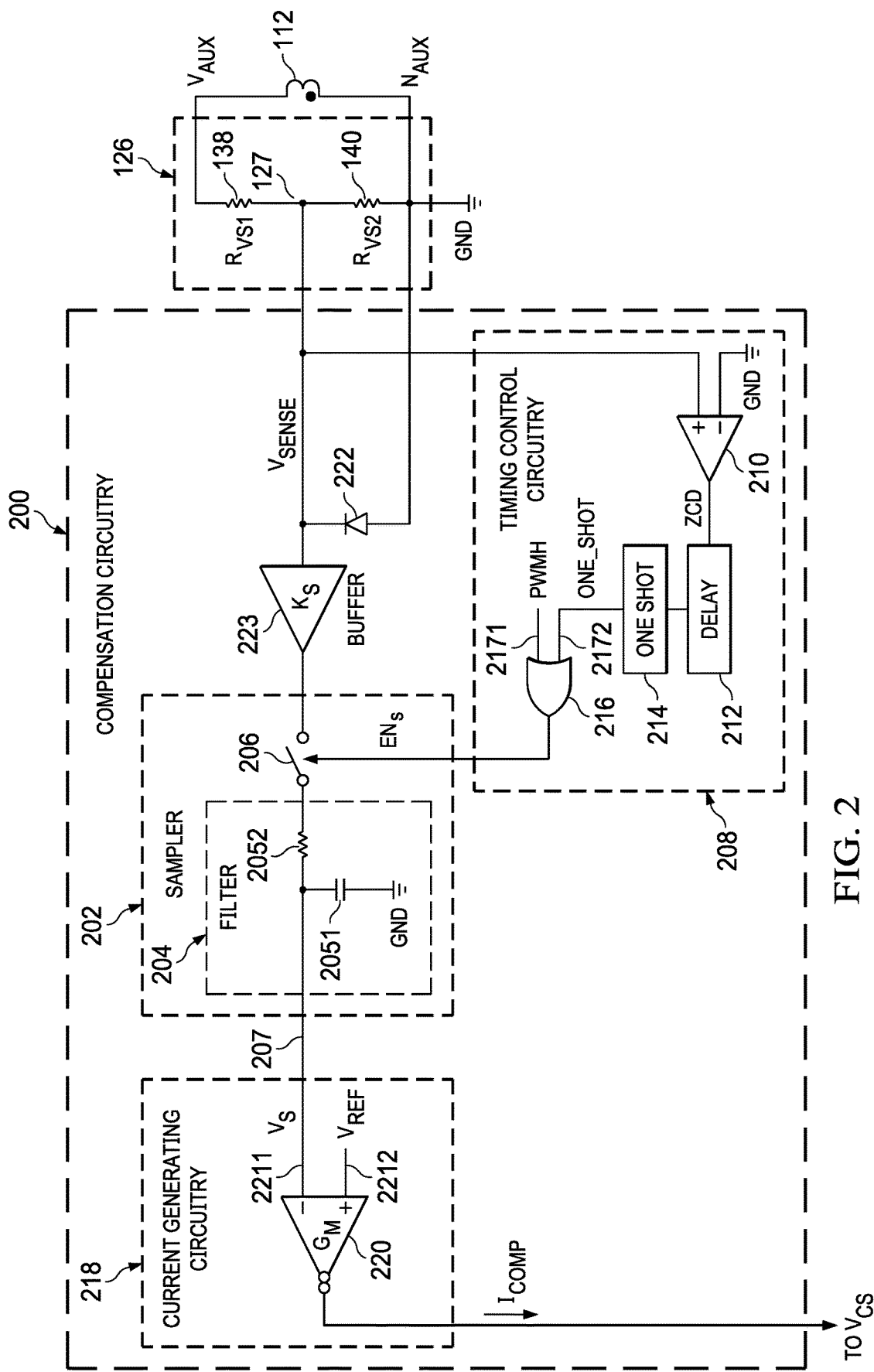
FIG. 2 shows a schematic circuit diagram of a compensation circuitry of a converter system in accordance with an implementation of the present disclosure.

FIG. 2 is an example schematic circuit diagram of a compensation circuitry 200, such as the compensation circuitry 124 of the converter system of FIG. 1, in accordance with an implementation of the present disclosure. The compensation circuitry 200 includes a sampler 202 configured to sample the sensed voltage $V_{SENSE}$, which is proportional to the auxiliary winding voltage $V_{AUX}$. The sampler 202 is also configured to generate a sampled voltage $V_S$ based on a sampling enable signal ENs. In one example, the sampler 202 includes a filter 204, and a first control switch 206 coupled in series with the filter 204 and the first control switch 206 controlled by the sampling enable signal ENs. In one example, the filter 204 includes a capacitor 2051 coupled between an output terminal 207 of the sampler and the ground terminal GND, and a resistor 2052 coupled to the capacitor 2051. The first control switch 206 is coupled in series with the resistor 2052.

The compensation circuitry 200 also includes timing control circuitry 208 coupled to the sampler 202. The compensation circuitry 200 is configured to assert the sampling enable signal ENs when either the second switch 116 is on or a delay after detecting the auxiliary winding voltage $V_{AUX}$ increasing above zero expires. The timing control circuitry 208 includes a comparator 210 with a non-inverting input terminal coupled to the voltage divider 126, an inverting input terminal coupled to the ground terminal GND, and an output terminal configured to assert a zero-crossing-detect signal ZCD when the auxiliary winding voltage $V_{AUX}$ is greater than ground voltage. The timing control circuitry 208 also includes a delay unit 212 coupled to the output terminal of the comparator 210, and the delay unit 212 configured to generate a delayed zero-crossing-detect signal based on the zero-crossing-detect signal ZCD. The delay between the zero-crossing-detect signal and the delayed zero-crossing-detect signal enables the sampler 202 to capture a settled positive level of the auxiliary winding voltage $V_{AUX}$. The timing control circuitry 208 further includes a one-shot signal generator 214 coupled to the delay unit 212, the one-shot signal generator 214 configured to generate a ONE_SHOT signal based on the delayed zero-crossing-detect signal. A pulse width of the ONE_SHOT signal provides a minimum sampling time after the delayed zero-crossing-detect signal goes high, in order to allow the sampler 202 functional when PWMH is at logic low state in the hard switching mode. The timing control circuitry 208 further includes a logic gate 216 with a first input terminal 2171 coupled to the switch control circuitry 120 to receive the control signal PWMH, a second input terminal 2172 coupled to the one-shot signal generator 214, and an output terminal coupled to the first control switch 206, and the output terminal of the logic gate 216 providing the sampling enable signal ENs. In one example, the logic gate 216 is an OR gate, such that the sampler 202 samples the auxiliary winding voltage $V_{AUX}$ when either the second switch 116 is on or a delay after detecting the auxiliary winding voltage $V_{AUX}$ increasing above zero expires.

The compensation circuitry 200 further includes current generating circuitry 218, coupled to the sampler 202, and the current generating circuitry 218 configured to generate a compensation current $I_{COMP}$ based on a difference between the sampled voltage $V_S$ and a reference voltage $V_{REF}$. The reference voltage $V_{REF}$ can be generated internally based on the voltage $V_{DD}$ or provided from external based on a predetermined value. In one example, the current generating circuitry 218 includes a transconductance amplifier 220 with a gain $G_M$. The transconductance amplifier 220 includes a first input terminal 2211 adapted to receive the sampled voltage $V_S$ from the sampler 202, and a second input terminal 2212 adapted to receive the reference voltage $V_{REF}$. The transconductance amplifier 220 is configured to generate the compensation current $I_{COMP}$ proportional to the difference between the reference voltage $V_{REF}$ and the sampled voltage $V_S$. In another example, the transconductance amplifier 220 can be replaced by other circuitries that are configured to convert a voltage signal to a current signal, such as a voltage-controlled constant-current source (not shown), or a resistor (not shown) coupled between the sampled voltage $V_S$ and the reference voltage VREF and a current mirror (not shown) configured to mirror the current through the resistor coupled between the sampled voltage $V_S$ and the reference voltage $V_{REF}$. The compensation current $I_{COMP}$ is provided to the compensation resistor 128, and a voltage across the compensation resistor 128 is provided as the offset signal ΔV. In one example, the compensation resistor 128 can be a part of the compensation circuitry 200.

In one example, the compensation circuitry 200 further includes a clamp diode 222 coupled between the common terminal 127 of the voltage divider 126 and the ground terminal GND, and reverse biased with respect to the common terminal 127. With reference to FIG. 1, when PWML is in an on state, the auxiliary winding voltage $V_{AUX}$ is negative, and the clamp diode 222 is configured to protect the rest circuitry of the compensation circuitry 200 from a negative voltage. After PWML is in a logic low state, the auxiliary winding voltage $V_{AUX}$ increases to a positive level proportional to the output voltage $V_{OUT}$.

In one example, the compensation circuitry 200 further includes a buffer 223 with a gain $K_S$ and coupled between the sampler 202 and the voltage divider 126. The compensation current $I_{COMP}$ and the offset signal $\Delta V$ are respectively determined in accordance with the equations below:

$$I_{COMP} \approx G_M \cdot \left( V_{REF} - \frac{K_S \cdot R_{VS2}}{R_{VS1} + R_{VS2}} \cdot \frac{N_{AUX}}{N_S} \cdot V_{OUT} \right) \quad (2)$$

$$\Delta V \approx I_{COMP} \cdot R_{COMP} \quad (3)$$

where $R_{VS1}$ and $R_{VS2}$ are respectively resistance of resistors of the voltage divider 126.

The reference voltage $V_{REF}$ is determined such that the compensation current $I_{COMP}$ is diminished when the output voltage $V_{OUT}$ is high, and the value of $I_{COMP}$ is in inversely proportional to the output voltage $V_{OUT}$. The compensation provided by the offset signal $\Delta V$ changes with linear adjustment.

Figure 3:
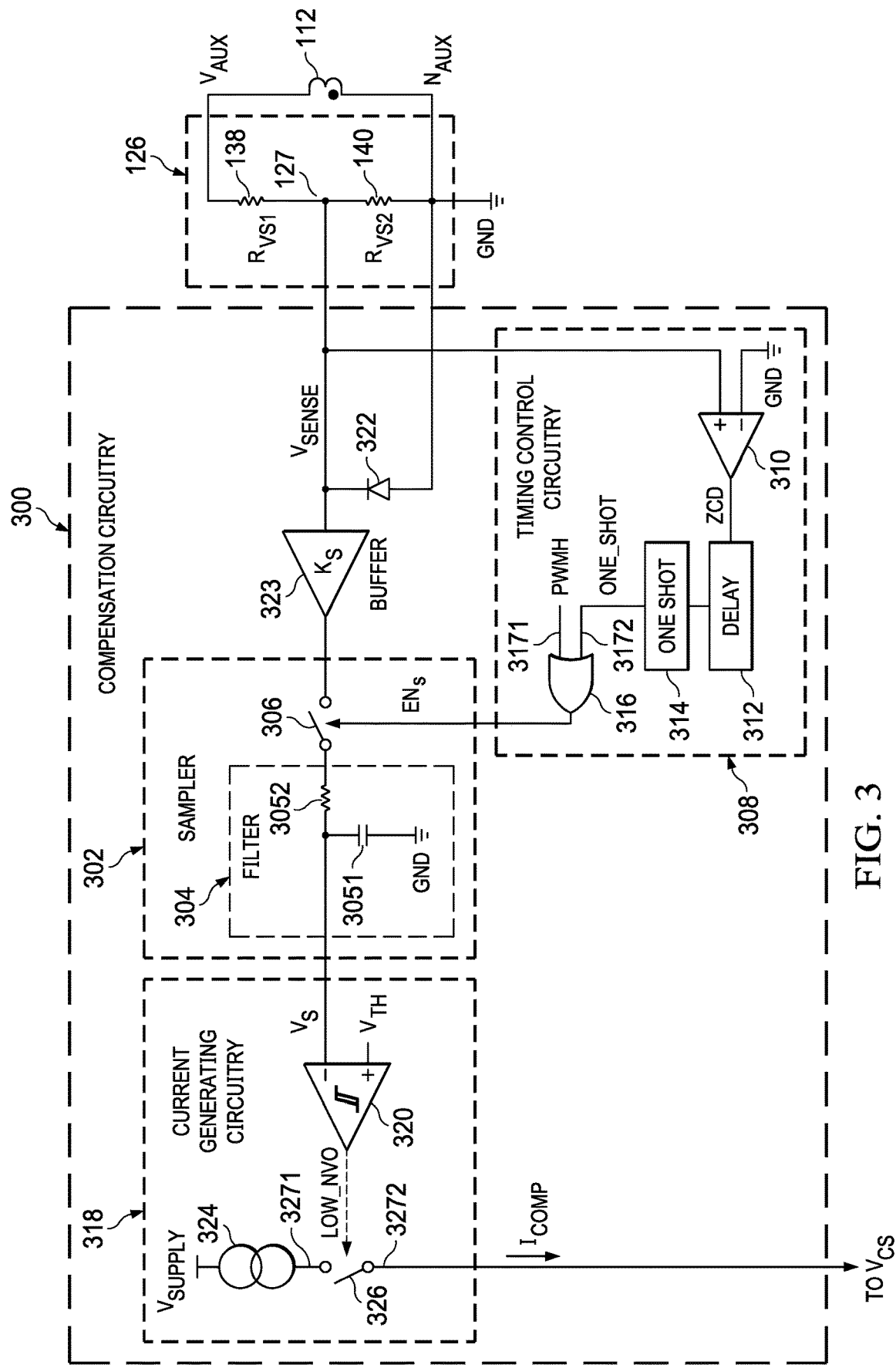
FIG. 3 shows a schematic circuit diagram of a compensation circuitry of a converter system in accordance with another implementation of the present disclosure.

FIG. 3 is another example schematic circuit diagram of a compensation circuitry 300, such as the compensation circuitry 124 of the converter system of FIG. 1, in accordance with another implementation of the present disclosure.

Similar to the compensation circuitry 200 of FIG. 2, the compensation circuitry 300 also includes a sampler 302 having a filter 304 and a first control switch 306, a timing control circuitry 308 coupled to the first control switch 306. The timing control circuitry 308 includes a comparator 310 configured to assert a zero-crossing-detect signal ZCD when the auxiliary winding voltage $V_{AUX}$ is greater than ground voltage, e.g. zero, a delay unit 312 coupled to the comparator 310 and the delay unit 312 configured to generate a delayed zero-crossing-detect signal based on the zero-crossing-detect signal ZCD, and a one-shot signal generator 314 coupled to the delay unit 312 and the one-shot signal generator 314. The one-shot signal generator is configured to generate a ONE_SHOT signal based on the delayed zero-crossing-detect signal. The timing control circuitry 308 further includes a logic gate 316, for example, an OR gate, with a first input 3171 coupled to the switch control circuitry 120 to receive the control signal PWMH, a second input 3172 coupled to the one-shot signal generator 314, and an output terminal coupled to the first control switch 306 and providing the sampling enable signal ENs.

In the example shown in FIG. 3, the current generating circuitry 318 includes a second comparator 320 coupled to receive the sampled voltage $V_S$ from the sampler 302 and the second comparator 320 configured to compare the sampled voltage $V_S$ with a threshold voltage $V_{TH}$ and generate an output signal LOW_NVO. The threshold voltage $V_{TH}$ is determined based on and lower than a desired sampled voltage $V_S$ when the converter system 100 is configured to convert the input voltage $V_{IN}$ to the first desired output voltage, e.g. the relative high voltage. The threshold voltage $V_{TH}$ can be generated internally based on the voltage $V_{VDD}$ or provided from external based on a predetermined value. The current generating circuitry 318 also includes a current source 324 coupled to a supply voltage $V_{SUPPLY}$ and the current source 324 configured to generate a fixed offset current $I_{OFFSET}$. The supply voltage $V_{SUPPLY}$ can be generated internally based on the voltage $V_{VDD}$ or provided from external based on a predetermined value of the fixed offset current $I_{OFFSET}$. The current generating circuitry 318 further includes a second control switch 326 having a first terminal 3271 coupled to the current source 324 and a second terminal 3272 for outputting the compensation current $I_{COMP}$. The second control switch 326 is controlled by the output signal LOW_NVO from the second comparator 320.

In one example, when the sampled voltage $V_S$ is lower than the threshold voltage $V_{TH}$, that is, when $$V_{OUT} < \frac{V_{TH} \cdot K_S \cdot (R_{VS1} + R_{VS2})}{R_{VS2}} \cdot \frac{N_S}{N_{AUX}}, \quad (4)$$

the output signal LOW_NVO is configured to close the second control switch 326, the compensation current $I_{COMP}$ is output by the current generating circuitry 318 based on the fixed current $I_{OFFSET}$. The offset signal $\Delta V \approx I_{OFFSET} \cdot R_{COMP}$. When the sampled voltage $V_S$ is greater than the threshold voltage $V_{TH}$, that is, when $$V_{OUT} > \frac{V_{TH} \cdot K_S \cdot (R_{VS1} + R_{VS2})}{R_{VS2}} \cdot \frac{N_S}{N_{AUX}}, \quad (5)$$

the output signal LOW_NVO is configured to open the second control switch 326, the compensation current ICOMP is 0 A, and the offset signal $\Delta V=0V$.

In one example, the compensation circuitry 300 further includes a clamp diode 322 coupled between the common terminal 127 of the voltage divider 126 and the ground terminal GND, and reverse biased with respect to the common terminal 127, and a buffer 323 with a gain $K_S$ and coupled between the sampler 302 and the voltage divider 126.

Figure 4:
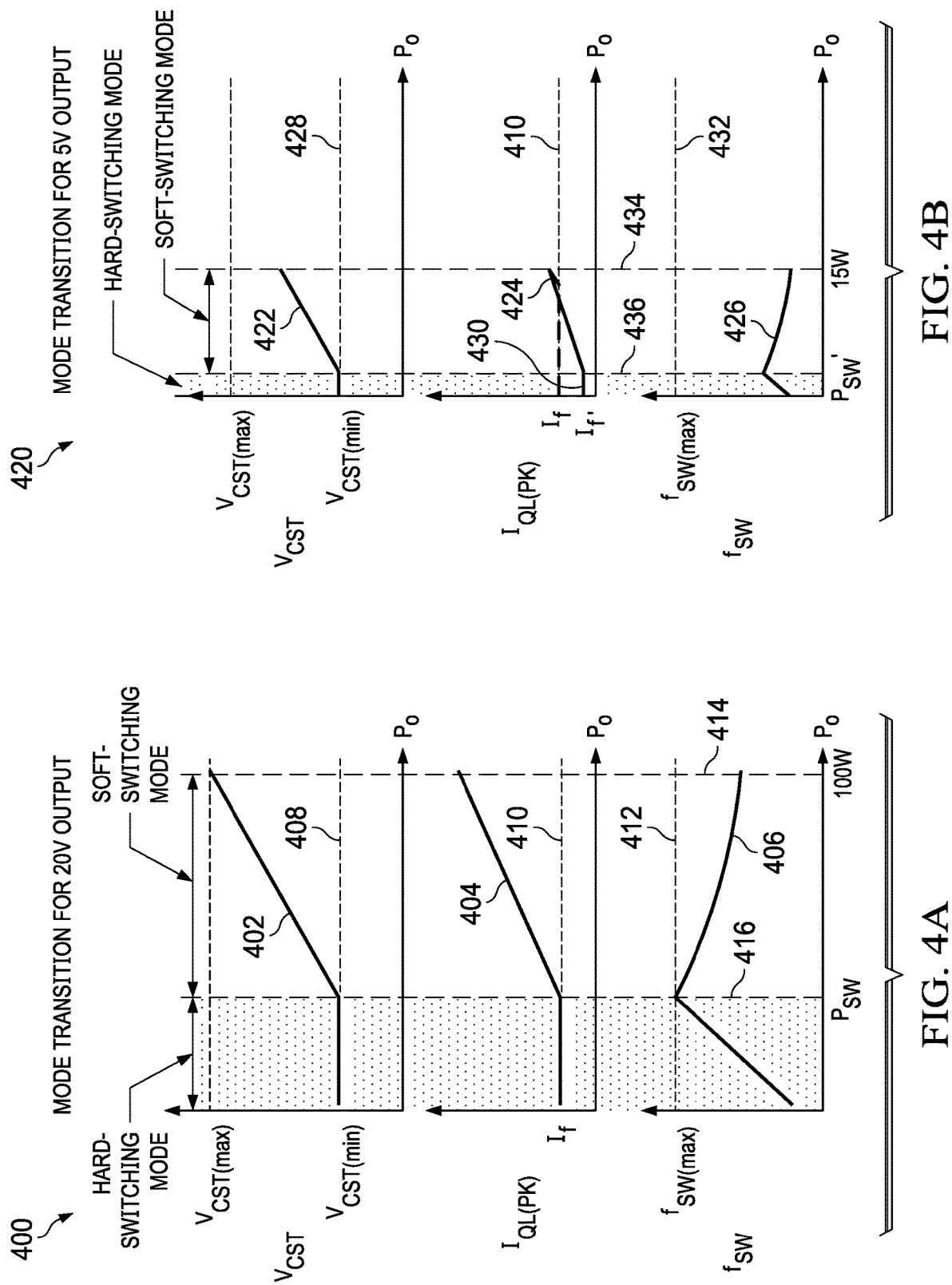
FIGS. 4A and 4B respectively show illustrative diagrams of waveforms of the converter system of FIG. 1 operating to output a high output voltage and operating to output a low output voltage.

FIGS. 4A and 4B respectively show illustrative diagrams 400 and 420 of waveforms of switching mode transition between the soft switching mode and the hard switching mode of the converter system 100 of FIG. 1 in conditions when the output voltage $V_{OUT}$ is high, such as 20V, and when the output voltage $V_{OUT}$ is low, such as 5V, for applications of a 100 W USB Power Delivery (PD) adapter for 20V/100 W notebook adapter and 5V/15 W phone charger, respectively.

As shown in FIG. 4A, when the output voltage $V_{OUT}$ is relatively high, for example, $V_{OUT}$=20V, with reference to FIG. 1, as an offset signal $\Delta V_{20V}$ is compensated to the sensed signal $V_{CS0} \approx I_{QL} \cdot R_{CS}$, $V_{CS0}+\Delta V_{20V}$ is compared with the threshold $V_{CST} \cdot \Delta V_{20V}$ can be configured to be 0V by configuring the reference voltage VREF of the current generating circuitry 218 of FIG. 2 based on the equation (2), or by configuring the threshold voltage $V_{TH}$ of the current generating circuitry 318 of FIG. 3 based on the equation (5). The converter system 100 operates in the soft switching mode in a heavy load condition. When the output load of the converter system 100 gets lower, the output power Po decreases from a maximum value 100 W 414, the threshold $V_{CST}$ 402 decreases with the decreasing of the output power Po of the converter system 100, the peak current $I_{QL(PK)}$ 404 of the current $I_{QL}$ decreases with the decreasing of the output power Po of the converter system 100, and the switching frequency $f_{SW}$ 406 increases with decreasing of the output power Po of the converter system 100. At mode switching point Psw 416, the threshold $V_{CST}$ reaches the minimum value $V_{CST(min)}$ 408, the peak current $I_{QL(PK)}$ 404 of the current $I_{QL}$ reaches a value $I_f$ 410, a light load condition is detected, the converter system 100 switches from the soft switching mode to the hard switching mode. The switching frequency $f_{SW}$ is limited under a maximum value $f_{SW(max)}$ 412. In the hard switching mode, the threshold $V_{CST}$ 402 is fixed at the minimum value $V_{CST(min)}$ 408, the peak current $I_{QL(PK)}$ 404 of the current $I_{QL}$ is fixed at the value $I_f$ 410, and the switching frequency $f_{SW}$ 406 decreases with the decreasing of the output power Po. Therefore, when the output voltage $V_{OUT}$ of the converter system 100 is relatively high, the converter system 100 is configured to operate in the soft switching mode in a heavy load condition where the output power Po is greater than Psw 416, and operate in the hard switching mode in a light load condition where the output power Po is less than Psw 416.

As shown in FIG. 4B, when the output voltage $V_{OUT}$ is relatively low, for example, $V_{OUT}$=5V, with reference to FIG. 1, as an offset signal $\Delta V_{5V}$, which is inversely proportional to the output voltage $V_{OUT}$, is compensated to the sensed signal $V_{CS0} \approx I_{QL} \cdot R_{CS}$, $V_{CS0} + \Delta V_{5V}$ is compared with the threshold $V_{CST}$. The converter system 100 operates in the soft switching mode in a heavy load condition. When the output load of the converter system 100 gets lighter, the output power Po decreases from a maximum value 15 W 434, the threshold $V_{CST}$ 422 decreases with the decreasing of the output power Po of the converter system 100, the peak current $I_{QL(PK)}$ 424 of the current $I_{QL}$ decreases with the decreasing of the output power Po of the converter system 100, and the switching frequency $f_{SW}$ 426 increases with decreasing of the output power Po of the converter system 100. At mode switching point Psw' 436, the threshold $V_{CST}$ reaches the minimum value $V_{CST(min)}$ 428, due to the compensation signal $\Delta V_{5V}$, the peak current $I_{QL(PK)}$ 424 of the current $I_{QL}$ reaches a value $I_f'$ 430 lower than the value $I_f$ 410 which is the peak current $I_{QL(PK)}$ of the current $I_{QL}$ when the converter system 100 is in the hard switching mode when $V_{OUT}$=20V, and the converter system 100 switches from the soft switching mode to the hard switching mode. In the hard switching mode, the threshold $V_{CST}$ 422 is fixed at the minimum value $V_{CST(min)}$, the peak current $I_{QL(PK)}$ 424 of the current $I_{QL}$ is fixed at the value $I_f'$ lower than the value $I_f$ 410, and the switching frequency $f_{SW}$ 426 decreases with the decreasing of the output power Po. Therefore, when the output voltage $V_{OUT}$ of the converter system 100 is relatively low, the converter system 100 is configured to operate in the soft switching mode in a heavy load condition where the output power Po is greater than Psw' 436, and the converter system 100 is configured to operate in the hard switching mode in a light load condition where the output power Po is less than Psw' 436. The switching point Psw' 436 when the output voltage is low, is less than the switching point Psw 416 when the output voltage is high. The load range (output power range) of the hard switching mode changes dynamically with the change of the output voltage $V_{OUT}$, which optimizes the efficiency of the converter system 100.

Figure 5:
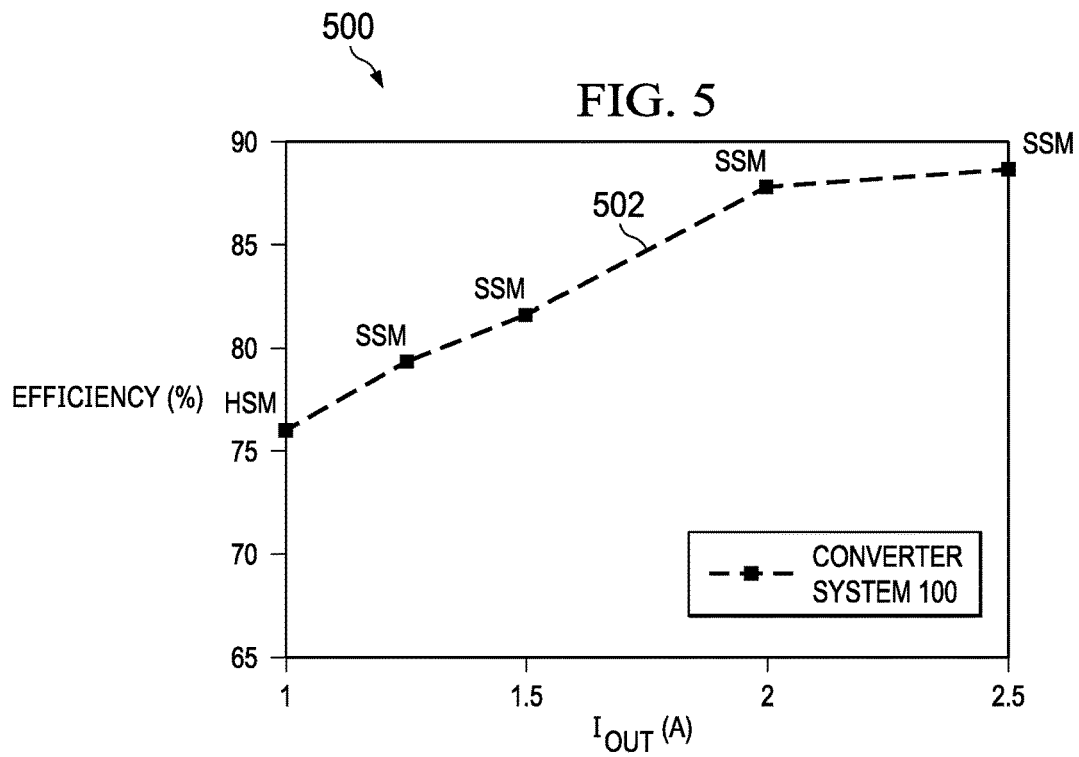
FIG. 5 is a diagram of simulation results of the efficiency of the converter system of FIG. 1.

FIG. 5 is a diagram 500 of simulation results of the efficiency of the converter system 100 of FIG. 1, when the output voltage $V_{OUT}$=5V. Line 502 depicts the efficiency of the converter system 100 of FIG. 1 having a compensation circuitry 124. When the output current $I_{OUT}$ is 1 A, the converter system 100 operates in the hard switching mode (HSM), and the converter system 100 operates in the soft switching mode (SSM) with the increasing of the output current $I_{OUT}$.

Figure 6:
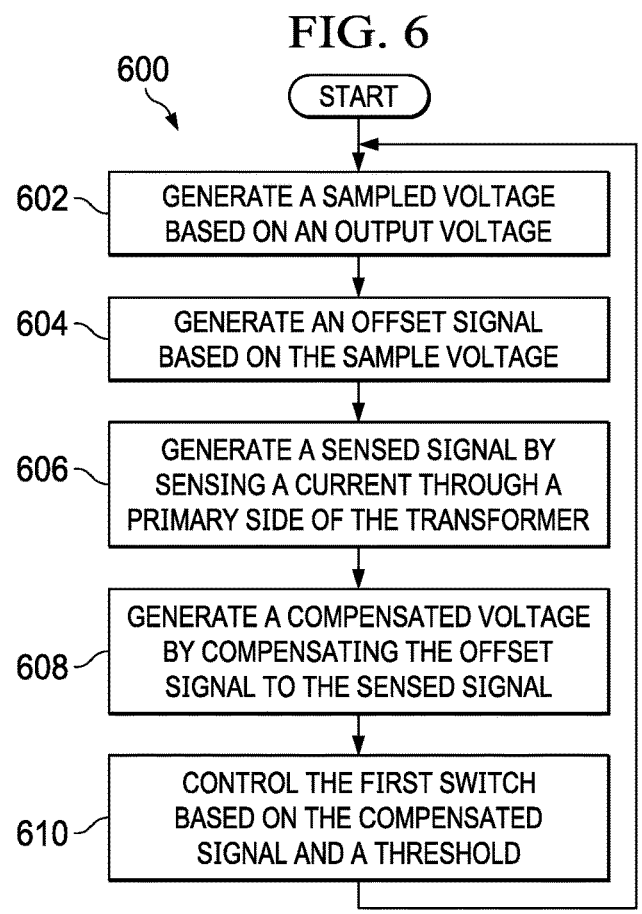
FIG. 6 is a flow chart of a method of operating a converter system in accordance with an implementation of the present disclosure.

Referring to FIG. 6, a flow chart 600 of a method of operating a converter system in accordance with an implementation of the present disclosure.

Starting at step 602, with reference to the converter system 100 of FIG. 1, and the compensation circuitry 200 of FIG. 2, the sampler 202 generates a sampled voltage $V_S$ based on the output voltage $V_{OUT}$ of the converter system 100. In one example, the sampled voltage $V_S$ is generated based on an auxiliary winding voltage $V_{AUX}$, which is proportional to the output voltage $V_{OUT}$ of the converter system 100. The sampled voltage $V_S$ is generated when the second switch 116 is on or a delay after detecting the output voltage $V_{OUT}$ increases above zero.

At step 604, the compensation circuitry 124 generates an offset signal $\Delta V$ by providing generating a compensation current $I_{COMP}$ based on the sampled voltage $V_S$, and providing the compensation current $I_{COMP}$ to a compensation resistor $R_{COMP}$ 128. The offset signal $\Delta V$ is a voltage across the compensation resistor $R_{COMP}$ 128. In one example, with reference to the compensation circuitry 200 of FIG. 2, the transconductance amplifier 220 converts a difference between the sampled voltage $V_S$ and a reference voltage $V_{REF}$ to the compensation current $I_{COMP}$. The compensation current $I_{COMP}$ is provided to the compensation resistor $R_{COMP}$ 128 to provide an offset signal $\Delta V \approx I_{COMP} \cdot R_{COMP}$ across the compensation resistor $R_{COMP}$ 128. In another example, with reference to the compensation circuitry 300 of FIG. 3, the second comparator 320 compares the sampled voltage $V_S$ with a threshold voltage $V_{TH}$, and generates an output signal LOW_NVO when the sampled voltage $V_S$ is lower than the threshold $V_{TH}$. The output signal LOW_NVO controls the second control switch 326 to close such that an offset current provided by a current source 324 is output as the compensation current $I_{COMP}$ to the compensation resistor $R_{COMP}$ 128 to provide an offset signal $\Delta V \approx I_{COMP} \cdot R_{COMP}$ across the compensation resistor $R_{COMP}$ 128.

At step 606, a current sensing resistor $R_{CS}$ 123 generates a sensed signal $V_{CS0}$ proportional to a current flowing through the primary side winding 108, where $V_{CS0} \approx I_{QL} \cdot R_{CS}$, and $I_{QL}$ is the value of the current flowing through the first switch 114 that is coupled in series with the primary side winding 108.

At step 608, the compensation circuitry 124 generates a compensated voltage $V_{CS}$, which is a combination of the sensed signal $V_{CS0} \approx I_{QL} \cdot R_{CS}$ and the offset signal $\Delta V \approx I_{COMP} \cdot R_{COMP}$. The compensated voltage $V_{CS}$ is generated at a first terminal 1291 of the compensation resistor $R_{COMP}$ 128. The offset signal $\Delta V$ is greater when the output voltage $V_{OUT}$ is low, and the offset signal $\Delta V$ is smaller or even zero when the output voltage $V_{OUT}$ is high.

At step 610, the switch control circuitry 120 controls the first switch 114 through the driver 121 based on a current control signal $S_C$ that is generated by the first comparator 130. The first comparator 130 compares the compensated voltage $V_{CS}$ with the threshold $V_{CST}$, and asserts the current control signal $S_C$ to switch off the first switch 114 when the compensated voltage $V_{CS}$ is greater than the threshold $V_{CST}$. Therefore, as shown in FIG. 4B, when the output voltage $V_{OUT}$ is a low voltage, the peak current $I_{QL(PK)}$ of the current $I_{QL}$ flowing through the first switch at the mode switching point between the soft switching mode and hard switching mode gets lower with the compensation of the offset signal $\Delta V$, such that the converter system 100 achieves a wide output power range of the soft switching mode, which improves the efficiency of the converter system 100.

The description of the preferred implementations of the present disclosure has been presented for purposes of illustration and description, but is not intended to be exhaustive or to limit the disclosure to the forms disclosed. Numerous modifications, changes, variations, substitutions, and equivalents will be apparent to those skilled in the art, without departing from the spirit and scope of the present disclosure, as described in the claims.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B by direct connection, or in a second example device A is coupled to device B through intervening component C if intervening component C does not alter the functional relationship between device A and device B such that device B is controlled by device A via the control signal generated by device A.

The invention claimed is:

1. A converter system, comprising:
a transformer having a primary side and a secondary side;
a first switch having a first current terminal, a second current terminal, and a control terminal, the first current terminal coupled to the primary side of the transformer and the second current terminal coupled to a voltage supply terminal;
a second switch having a third current terminal, a fourth current terminal, and a second control terminal, the third current terminal coupled to the first current terminal;
loop control circuitry coupled to the secondary side of the transformer, and the loop control circuitry comprising:
a comparator having a first comparator input, a second comparator input, and a comparator output;
a compensation resistor having a first resistor terminal and a second resistor terminal, the first resistor terminal coupled to the fourth current terminal and the second resistor terminal coupled to the first comparator input; and
compensation circuitry coupled to the first comparator input and to the second resistor terminal, the compensation circuitry configured to produce a compensated signal; and
switch control circuitry coupled to the comparator output, and the switch control circuitry configured to control the first and second switches based on the compensated signal.

2. The converter system of claim 1, wherein the compensation circuitry comprises:
a sampler configured to sample a sensed voltage proportional to an output voltage to produce a sampled voltage based on a sampling enable signal;
timing control circuitry coupled to the sampler, and the timing control circuitry configured to produce the sampling enable signal based on the sensed voltage and an output of the switch control circuitry; and
current generating circuitry coupled to the sampler and to the compensation resistor, and the current generating circuitry configured to produce a compensation current based on a difference between the sampled voltage and a reference voltage.

3. The converter system of claim 2, wherein the sampler comprises:
a filter comprising a capacitor and a resistor, the filter configured to receive the sensed voltage; and
a first control switch coupled to the filter, and the first control switch configured to enable the sampler when the sampling enable signal is asserted.

4. The converter system of claim 3, wherein the timing control circuitry comprises:
a second comparator with a non-inverting input terminal, the second comparator configured to receive the sensed voltage at the non-inverting input terminal and to produce a zero-crossing-detect signal in response to detecting the sensed voltage increasing above zero;
a delay unit coupled to an output terminal of the second comparator, and the delay unit configured to produce a delayed zero-crossing-detect signal based on the zero-crossing-detect signal;
a one-shot signal generator coupled to the delay unit, and the one-shot signal generator configured to generate a one-shot signal based on the delayed zero-crossing-detect signal; and
a logic gate coupled to the one-shot signal generator and to the sampler.

5. The converter system of claim 2, wherein the current generating circuitry comprises a transconductance amplifier configured to receive the sampled voltage, and the transconductance amplifier configured to generate the compensation current proportional to the difference between the reference voltage and the sampled voltage.

6. The converter system of claim 2, wherein the current generating circuitry comprises:
a third comparator configured to receive the sampled voltage;
a current source configured to generate the compensation current; and
a second control switch having a first terminal and a second terminal, the first terminal coupled to the current source and the second terminal configured to output the compensation current, wherein the current generating circuitry is configured to output the compensation current while the sampled voltage is smaller than a threshold.

7. The converter system of claim 2, wherein the secondary side of the transformer comprises a secondary side winding configured to output the output voltage and the secondary side of the transformer comprises an auxiliary winding, wherein the converter system further comprises a voltage divider coupled to the auxiliary winding, and the voltage divider configured to generate the sensed voltage proportional to the output voltage at an output terminal of the voltage divider.

8. The converter system of claim 7, wherein the compensation circuitry comprises a clamp diode reverse biased with respect to the output terminal of the voltage divider.

9. The converter system of claim 7, wherein the compensation circuitry further comprises a buffer coupled between the sampler and the voltage divider.

10. A controller comprising:
loop control circuitry comprising:
a comparator having a first comparator input, a second comparator input, and a comparator output;
a compensation resistor having a first resistor terminal and a second resistor terminal, the first resistor terminal adapted to be coupled to a first switch and the second resistor terminal coupled to the first comparator input; and
compensation circuitry coupled to the first comparator input and to the second resistor terminal; and
switch control circuitry coupled to the comparator output, to the second comparator input, and to the switch control circuitry, the switch control circuitry adapted to be coupled to the first switch and to a second switch.

11. The controller of claim 10, wherein the compensation circuitry comprises:
a sampler configured to sample a sensed voltage proportional to an output voltage to produce a sampled voltage based on a sampling enable signal;
timing control circuitry coupled to the sampler, and the timing control circuitry configured to produce the sampling enable signal; and current generating circuitry coupled to the sampler and to the compensation resistor, and the current generating circuitry configured to produce a compensation current based on a difference between the sampled voltage and a reference voltage.

12. The controller of claim 11, wherein the sampler comprises:
   a filter comprising a capacitor and a resistor, the filter configured to receive the sensed voltage; and
   a first control switch coupled to the filter, and the first control switch configured to enable the sampler when the sampling enable signal is asserted.

13. The controller of claim 12, wherein the comparator is a first comparator and the comparator output is a first comparator output, the timing control circuitry comprising:
   a second comparator having a non-inverting input terminal and a second comparator output, the second comparator configured to receive the sensed voltage at the non-inverting input terminal and to produce a zero-crossing-detect signal at the second comparator output after detecting the sensed voltage increasing above zero;
   a delay unit coupled to the second comparator output, the delay unit configured to produce a delayed zero-crossing-detect signal based on the zero-crossing-detect signal;
   a one-shot signal generator coupled to the delay unit, and the one-shot signal generator configured to generate a one-shot signal based on the delayed zero-crossing-detect signal; and
   a logic gate coupled to the one-shot signal generator, and the logic gate configured to assert an enable signal based on the one-shot signal and a second control signal.

14. The controller of claim 11, wherein the current generating circuitry comprises a transconductance amplifier configured to receive the sampled voltage, and the transconductance amplifier configured to generate the compensation current proportional to the difference between the reference voltage and the sampled voltage.

15. The controller of claim 11, wherein the current generating circuitry comprises:
   a third comparator configured to receive the sampled voltage;
   a current source configured to generate the compensation current; and
   a second control switch having a first terminal and a second terminal, the first terminal coupled to the current source and the second terminal configured to output the compensation current, wherein the current generating circuitry is configured to output the compensation current when the sampled voltage is smaller than a threshold.

16. The controller of claim 10, wherein the compensation circuitry comprises a clamp diode.

17. The controller of claim 11, wherein the compensation circuitry further comprises a buffer coupled to the sampler.

18. A circuit comprising:
   timing control circuitry configured to produce a sampling enable signal;
   a sampler coupled to the timing control circuitry, the sampler configured to sample a sensed voltage to produce a sampled voltage based on the sampling enable signal;
   current generating circuitry coupled to the sampler, and the current generating circuitry configured to produce a compensation current based on a difference between the sampled voltage and a reference voltage; and
   a compensation resistor coupled to the current generating circuitry.

19. The circuit of claim 18, wherein the time control circuitry comprises:
   a comparator having a first comparator input, a second comparator input, and a comparator output;
   a delay module coupled to the comparator output;
   a one shot module coupled to the delay module; and
   a logic circuit having a first logic input, a second logic input, and a logic output, the first logic input coupled to the one shot module, the second logic input configured to receive a pulse width modulation signal, and the logic output coupled to the sampler.

20. The circuit of claim 18, wherein the sampler comprises:
   a switch coupled to the timing control circuitry; and
   a filter coupled to the switch and to the current generating circuitry.

* * * * *